(12) United States Patent
Mizes et al.

(10) Patent No.: US 8,517,502 B2
(45) Date of Patent: Aug. 27, 2013

(54) METHOD AND SYSTEM FOR PRINTHEAD ALIGNMENT TO REDUCE OR ELIMINATE BANDING ARTIFACTS FOR INTERLACED PRINTHEADS

(75) Inventors: Howard A. Mizes, Pittsford, NY (US); David A. Mantell, Rochester, NY (US); Jeffrey J. Folkins, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 404 days.

(21) Appl. No.: 13/026,553

(22) Filed: Feb. 14, 2011

(65) Prior Publication Data

US 2012/0206530 A1    Aug. 16, 2012

(51) Int. Cl.
B41J 29/393    (2006.01)

(52) U.S. Cl.
USPC ............................................ 347/19

(58) Field of Classification Search
CPC ............... B41J 2/2135; B41J 2/04505
USPC ......................... 347/14, 15, 19, 41
See application file for complete search history.

(56) References Cited

U.S. PATENT DOCUMENTS

| | | | |
|---|---|---|---|
| 4,940,996 A | 7/1990 | Paton et al. |
| 5,093,674 A | 3/1992 | Storlie |
| 5,500,667 A | 3/1996 | Schwiebert et al. |
| 5,633,668 A | 5/1997 | Schwiebert et al. |
| 6,017,113 A | 1/2000 | Nicoloff, Jr. et al. |
| 6,412,907 B1 | 7/2002 | Castelli et al. |
| 6,536,894 B1 | 3/2003 | Rasmussen et al. |
| 6,587,652 B2 | 7/2003 | Metzler |
| 6,663,206 B2 * | 12/2003 | Taylor | ................. 347/9 |
| 6,788,432 B1 | 9/2004 | Garcia et al. |
| 6,799,830 B1 | 10/2004 | Brookfield et al. |
| 7,167,770 B1 | 1/2007 | Akira |
| 7,691,280 B2 | 4/2010 | Waldrop et al. |
| 8,167,404 B2 * | 5/2012 | Mantell et al. | ................. 347/41 |
| 2003/0132979 A1 | 7/2003 | Taylor |

(Continued)

FOREIGN PATENT DOCUMENTS

| | | |
|---|---|---|
| EP | 0340960 | 11/1989 |
| EP | 1 447 226 A1 | 8/2004 |

(Continued)

OTHER PUBLICATIONS

European Search Report corresponding to European Patent Application 10169752.2, European Patent Office, Rijswijk, Netherlands, Oct. 26, 2010 (6 pages).

(Continued)

*Primary Examiner* — An Do
(74) *Attorney, Agent, or Firm* — Maginot, Moore & Beck, LLP

(57) ABSTRACT

A method for aligning printheads, some of which are arranged in an overlapped configuration, in a printer has been developed. The method includes identifying a stitch error for each color station in a plurality of color stations in the printer. The stitch error is identified with reference to shrinkage of a print medium as the print medium passes the plurality of color stations. A portion of the stitch error is used to move at least one printhead in the color station corresponding to the stitch error to compensate for a banding issue caused by the overlapped printhead configuration. All or part of the stitch error may also be applied to other printheads in the color station to compensate for possible color to color registration issues.

26 Claims, 6 Drawing Sheets

(56) References Cited

U.S. PATENT DOCUMENTS

| | | |
|---|---|---|
| 2003/0156148 A1 | 8/2003 | King et al. |
| 2008/0124158 A1 | 5/2008 | Folkins |
| 2009/0141110 A1 | 6/2009 | Gervasi et al. |
| 2009/0293750 A1 | 12/2009 | Haenni et al. |
| 2010/0013882 A1 | 1/2010 | Mizes et al. |
| 2011/0012958 A1 | 1/2011 | Mantell et al. |

FOREIGN PATENT DOCUMENTS

| | | |
|---|---|---|
| EP | 1 609 602 A3 | 12/2005 |
| EP | 1 669 204 A1 | 6/2006 |
| WO | 0156798 | 8/2001 |

OTHER PUBLICATIONS

Nguyen, Thinh H., Non-final Office Action for U.S. Appl. No. 12/504,857, mailed Aug. 31, 2011 (8 pages).

Lockman, David M., Response to Non-final Office Action for U.S. Appl. No. 12/504,857, submitted Nov. 30, 2011 (11 pages).

United Kingdom Search Report corresponding to UK Application No. 1107830.0, United Kingdom Intellectual Property Office, Newport, South Wales, UK, Sep. 7, 2011 (3 pages).

* cited by examiner

METHOD AND SYSTEM FOR PRINTHEAD ALIGNMENT TO REDUCE OR ELIMINATE BANDING ARTIFACTS FOR INTERLACED PRINTHEADS

TECHNICAL FIELD

This disclosure relates generally to printhead alignment in an inkjet printer having one or more printheads, and, more particularly, to the positioning of printheads to reduce or eliminate banding artifacts in images formed on a media web as the media web passes through an inkjet printer.

BACKGROUND

Ink jet printers have printheads that operate a plurality of inkjets that eject liquid ink onto an image receiving member. The ink may be stored in reservoirs located within cartridges installed in the printer. Such ink may be aqueous, oil, solvent-based, or UV curable ink or an ink emulsion. Other inkjet printers receive ink in a solid form and then melt the solid ink to generate liquid ink for ejection onto the imaging member. In these solid ink printers, the solid ink may be in the form of pellets, ink sticks, granules or other shapes. The solid ink pellets or ink sticks are typically placed in an ink loader and delivered through a feed chute or channel to a melting device that melts the ink. The melted ink is then collected in a reservoir and supplied to one or more printheads through a conduit or the like. In other inkjet printers, ink may be supplied in a gel form. The gel is also heated to a predetermined temperature to alter the viscosity of the ink so the ink is suitable for ejection by a printhead.

A typical full width scan inkjet printer uses one or more printheads. Each printhead typically contains an array of individual nozzles for ejecting drops of ink across an open gap to an image receiving member to form an image. The image receiving member may be a continuous web of recording media, a series of media sheets, or the image receiving member may be a rotating surface, such as a print drum or endless belt. Images printed on a rotating surface are later transferred to recording media by mechanical force in a transfix nip formed by the rotating surface and a transfix roller. In an inkjet printhead, individual piezoelectric, thermal, or acoustic actuators generate mechanical forces that expel ink through an orifice from an ink filled conduit in response to an electrical voltage signal, sometimes called a firing signal. The amplitude, or voltage level, of the signals affects the amount of ink ejected in each drop. The firing signal is generated by a printhead controller in accordance with image data. An inkjet printer forms a printed image in accordance with the image data by printing a pattern of individual ink drops at particular locations on the image receiving member. The locations where the ink drops landed are sometimes called "ink drop locations," "ink drop positions," or "pixels." Thus, a printing operation can be viewed as the placement of ink drops on an image receiving member in accordance with image data.

In order for the printed images to correspond closely to the image data, both in terms of fidelity to the image objects and the colors represented by the image data, the printheads must be registered with reference to the imaging surface and with the other printheads in the printer. Registration of printheads is a process in which the printheads are operated to eject ink in a known pattern and then the printed image of the ejected ink is analyzed to determine the orientation of the printhead with reference to the imaging surface and with reference to the other printheads in the printer. Operating the printheads in a printer to eject ink in correspondence with image data presumes that the printheads are level with a width across the image receiving member and that all of the inkjet ejectors in the printhead are operational. The presumptions regarding the orientations of the printheads, however, cannot be assumed, but must be verified. Additionally, if the conditions for proper operation of the printheads cannot be verified, the analysis of the printed image should generate data that can be used either to adjust the printheads so they better conform to the presumed conditions for printing or to compensate for the deviations of the printheads from the presumed conditions.

Analysis of printed images is performed with reference to two directions. "Process direction" refers to the direction in which the image receiving member is moving as the imaging surface passes the printhead to receive the ejected ink and "cross-process direction" refers to the direction across the width of the image receiving member. In order to analyze a printed image, a test pattern needs to be generated so determinations can be made as to whether the inkjets operated to eject ink did, in fact, eject ink and whether the ejected ink landed where the ink would have landed if the printhead was oriented correctly with reference to the image receiving member and the other printheads in the printer. In some printing systems, an image of a printed image is generated by printing the printed image onto media or by transferring the printed image onto media, ejecting the media from the system, and then scanning the image with a flatbed scanner or other known offline imaging device. This method of generating a picture of the printed image suffers from the inability to analyze the printed image in situ and from the inaccuracies imposed by the external scanner. In some printers, a scanner is integrated into the printer and positioned at a location in the printer that enables an image of an ink image to be generated while the image is on media within the printer or while the ink image is on the rotating image member. These integrated scanners typically include one or more illumination sources and a plurality of optical detectors that receive radiation from the illumination source that has been reflected from the image receiving surface. The radiation from the illumination source is usually visible light, but the radiation may be at or beyond either end of the visible light spectrum. If light is reflected by a white imaging surface, the reflected light has a similar spectrum as the illuminating light. In some systems, ink on the imaging surface may absorb a portion of the incident light, which causes the reflected light to have a different spectrum. In addition, some inks may emit radiation in a different wavelength than the illuminating radiation, such as when an ink fluoresces in response to a stimulating radiation. Each optical sensor generates an electrical signal that corresponds to the intensity of the reflected light received by the detector. The electrical signals from the optical detectors may be converted to digital signals by analog/digital converters and provided as digital image data to an image processor.

The environment in which the image data are generated is not pristine. Several sources of noise exist in this scenario and should be addressed in the registration process. For one, alignment of the printheads can deviate from an expected position significantly, especially when different types of imaging surfaces are used or when printheads are replaced. Additionally, not all jets in a printhead remain operational without maintenance. Thus, a need exists to continue to register the heads before maintenance can recover the missing jets. Also, some jets are intermittent, meaning the jet may fire sometimes and not at others. Jets also may not eject ink perpendicularly with respect to the face of the printhead. These off-angle ink drops land at locations other than were they are expected to land. Some printheads are oriented at an angle with respect to the width of the image receiving member. This angle is sometimes known as printhead roll in the art. The image receiving member also contributes noise. Specifically, structure in the image receiving surface and/or colored contaminants in the image receiving surface may be identified as ink drops in the image data and lightly colored inks and weakly performing jets provide ink drops that contrast less starkly with the image receiving member than darkly colored inks or ink drops formed with an appropriate ink drop mass. Thus, improvements in printed images and the analysis of the image data corresponding to the printer images are useful for identifying printhead orientation deviations and printhead characteristics that affect the ejection of ink from a printhead. Moreover, image data analysis that enables correction of printhead issues or compensation for printhead issues is beneficial.

One factor affecting the registration of images printed by different groups of printheads is media shrinkage. Media shrinkage is caused as the media is subjected to relatively high temperatures as the media moves along the relatively long path through the printing system. In a web printing system, any high temperatures can drive moisture content from the web, which causes the web to shrink. If the physical dimensions of the web change after one group of printheads has formed an image in one color ink, but before another group of printheads has formed an image in another color of ink, then the registration of the two images is affected. The change may be sufficient to cause mis-registration between ink patterns ejected by the different groups of printheads. The amount of shrinkage depends, at least in part, upon the heat to which the web is subjected, the speed of the web as it moves over heated components, the moisture content of the paper, and the type of media material.

Media shrinkage affects the accuracy of the image analysis that enables printhead position correction. If media shrinkage is not considered during the analysis, the compensation data generated during the analysis are insufficient to achieve proper registration between the printheads. Reducing the effect of web dimensional changes on the analysis of test pattern images and the generation of the correction data for printhead positioning is a goal in web printing systems.

SUMMARY

In one embodiment, a method of aligning printheads in a printer has been developed. The method includes identifying a stitch error for each color station in a plurality of color stations in a printer and operating, for each color station with reference to the stitch error identified for the color station, an actuator to move a first plurality of printheads extending across the media substrate in a cross-process direction to a position where at least one printhead in a second plurality of printheads in the color station overlaps with at least one printhead in the first plurality of printheads in the color station. The stitch error in each color station is identified with reference to a dimensional change in a media substrate that occurs at each color station after a first printhead in a first color station ejects ink having a first color onto the media substrate, In another embodiment, a method for aligning printheads in a printer has been developed. The method includes identifying a stitch error for each color station in a plurality of color stations in a printer, and adjusting an overlap between a first printhead in a first plurality of printheads that extend across the media substrate and a second printhead in a second plurality of printheads that extend across the media substrate in each color station, each overlap being adjusted with reference to the stitch error identified for the color station in which the first plurality of printheads and the second plurality of printheads are located. The stitch error in each color station is identified with reference to a dimensional change in a media substrate that occurs at each color station after a first printhead in a first color station ejects ink having a first color onto the media substrate In another embodiment, a printer has been developed. The printer includes a media transport that is configured to transport media through the printer in a process direction, a plurality of actuators, a plurality of color stations, an imaging device, and a controller. Each color station ejects ink having a color that is different than the ink ejected by the other color stations in the plurality of color stations. Each color station is comprised of a first plurality of printheads and a second plurality of printheads, both the first group and the second group of printheads extend across a portion of the media transport in a cross-process direction that is orthogonal to the process direction. The printheads in the first plurality of printheads are spaced from one another in the cross-process direction and the printheads in the second plurality of printheads are spaced from one another in the cross-process direction. The first plurality of printheads are offset from the second plurality of printheads and configured to print a contiguous line across media being transported through the printer in the process direction. Each plurality of printheads in each color station is operatively connected to an actuator in the plurality of actuators to enable each plurality of actuators in each color station to be translated in the cross-process direction independently of the other pluralities of printheads in the printer. The imaging device is mounted proximate to a portion of the media transport to generate image data corresponding to a cross-process portion of the media being transported through the printer in the process direction after the media has received ink ejected from the printheads in the color stations. The controller is operatively connected to the imaging device, the plurality of actuators, and the printheads. The controller is configured to identify a stitch error for each color station in the plurality of color stations. The stitch error in each color station is identified with reference to a dimensional change in a media substrate that occurs at each color station after a first printhead in a first color station ejects ink having a first color onto the media substrate as the media substrate is transported by the media transport. The controller is configured to adjust the offset between the first plurality of printheads and the second plurality of printheads in a color station with reference to the stitch error identified for the color station in which the first and the second pluralities of printheads are located.

BRIEF DESCRIPTION OF THE DRAWINGS

The foregoing aspects and other features of a printer that is configured to align interlaced printheads to reduce or eliminate banding artifacts in printed images are explained in the following description, taken in connection with the accompanying drawings.

DETAILED DESCRIPTION

Figure 1:
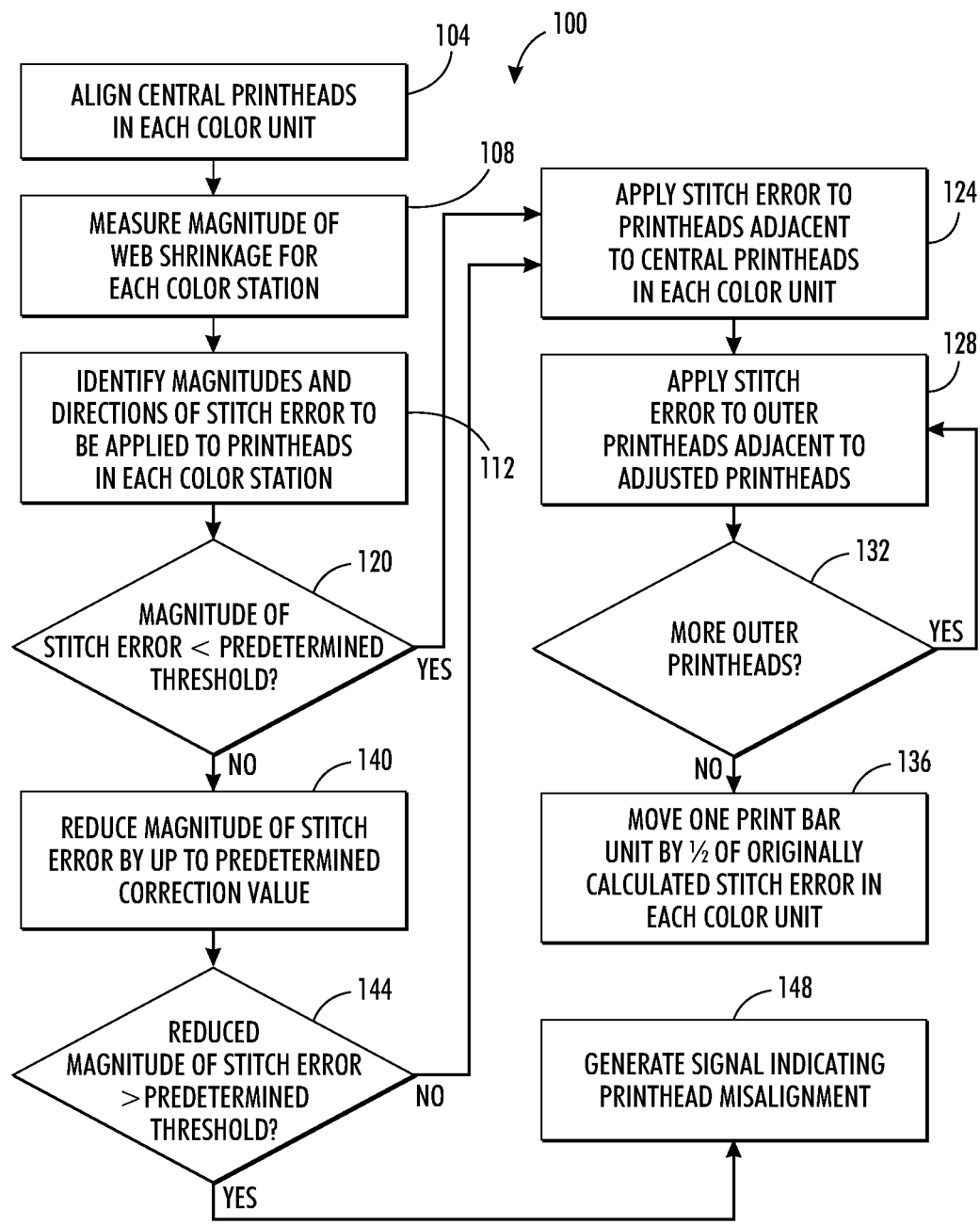
FIG. 1 is a block diagram of a process for aligning interlaced printheads in a printer.

For a general understanding of the environment for the system and method disclosed herein as well as the details for the system and method, reference is made to the drawings. In the drawings, like reference numerals have been used throughout to designate like elements. As used herein, the term "image receiving member" refers to a print medium, such as paper, or may be an intermediate imaging member, such as a print drum or endless belt, which holds ink images formed by inkjet printheads. As used herein, the term "process direction" refers to a direction in which an image receiving member moves relative to one or more printheads during an imaging operation. The term "cross-process direction" refers to a direction that is perpendicular to the process direction along the surface of the image receiving member. When referring to the cross-process direction, the term "outer" refers to a relative cross-process position that is toward one or both of the outer edges of the image receiving member, while "inner" refers to a relative cross-process position that is toward the center of the image receiving member.

The term "registration" refers to the relative positions of ink drops from different ink ejectors in the cross-process or process directions on a media web. Registration may refer to the distance between ink drops from one or more printheads that emit a single color of ink. The related term "color registration" refers to the relative cross-process positions of inks jetting from ejectors on one printhead that has one color ink and from ejectors on another printhead that has a different color ink. In multi-color printers, ink drops corresponding to a set of ink colors such as cyan, magenta, yellow, and black (CMYK) may be combined to form a wide range of visually perceptible colors. The color registration between different ink colors is affected by web shrinkage.

The term "stitch alignment" refers to a cross-process distance that separates ink ejectors positioned at adjoining ends of two printheads that are adjacent to one another in the cross-process direction in a printhead array. Two printheads are said to be in stitch alignment when the cross-process distance between the ejectors formed on each end of the printheads is substantially the same as the cross-process distance between adjacent ink ejectors formed within each printhead. Stitch errors refer to deviations from stitch alignment. In some cases, variations in the positions and alignment of adjacent printheads, referred to as runout errors, may result in stitch errors. The cross-process alignment of different printheads may be adjusted to reduce or eliminate these stitch errors. Stitch errors may also be introduced intentionally to mitigate image quality defects as described in more detail below. Stitch errors affect the overlap of adjacent printheads in the cross-process direction. Adjacent printheads may be moved farther apart to decrease or eliminate overlap, or adjacent printheads may be moved closer together to increase overlap.

As used herein, the term "printhead" refers to a group of inkjet ejectors arranged in fixed physical relationship to one another. The term "print bar" as used in this document refers to a linear arrangement of printheads that are configured for linearly movement as a group. The printhead group collectively referred to as a print bar is operatively connected to an actuator to enable the movement of the entire group in the cross-process direction. Some or all of the printheads on a print bar may be operatively connected to actuators that enable the printheads to move in a cross-process direction independently with respect to the other printheads on the print bar. In a staggered print bar arrangement, printheads are arranged in two groups or print bars that are positioned relative to one another in a staggered pattern. The staggered configuration enables the printheads on the two print bars to emit ink drops in a continuous line across an image receiving member in the cross-process direction. Two or more print bars with printheads in the staggered arrangement are referred to as a "print bar array." Some printing systems include print bar arrays with printheads that are configured to emit drops of a single color of ink. In one embodiment described below, a first print bar array enables ink printing at a resolution of 300 dots per linear inch (DPI) in the cross-process direction while a second print bar array has an offset with respect to the inkjet ejectors of the first print bar that is one half of the distance between inkjet ejectors and also prints at 300 DPI in the cross-process direction. In combination, the two print bar arrays print pixels with a resolution of 600 DPI in the cross-process direction.

Any arrangement of printheads that is configured to print ink having a single color across the width of the image receiving member may be referred to as a "color station." A color station may include one or more sets of printheads arranged on print bars as described above. Multi-color printers may arrange a plurality of color stations along a portion of a media path known as a "print zone." As an image receiving member passes through the print zone, ink drops from different color stations form images on the print medium.

Figure 4:
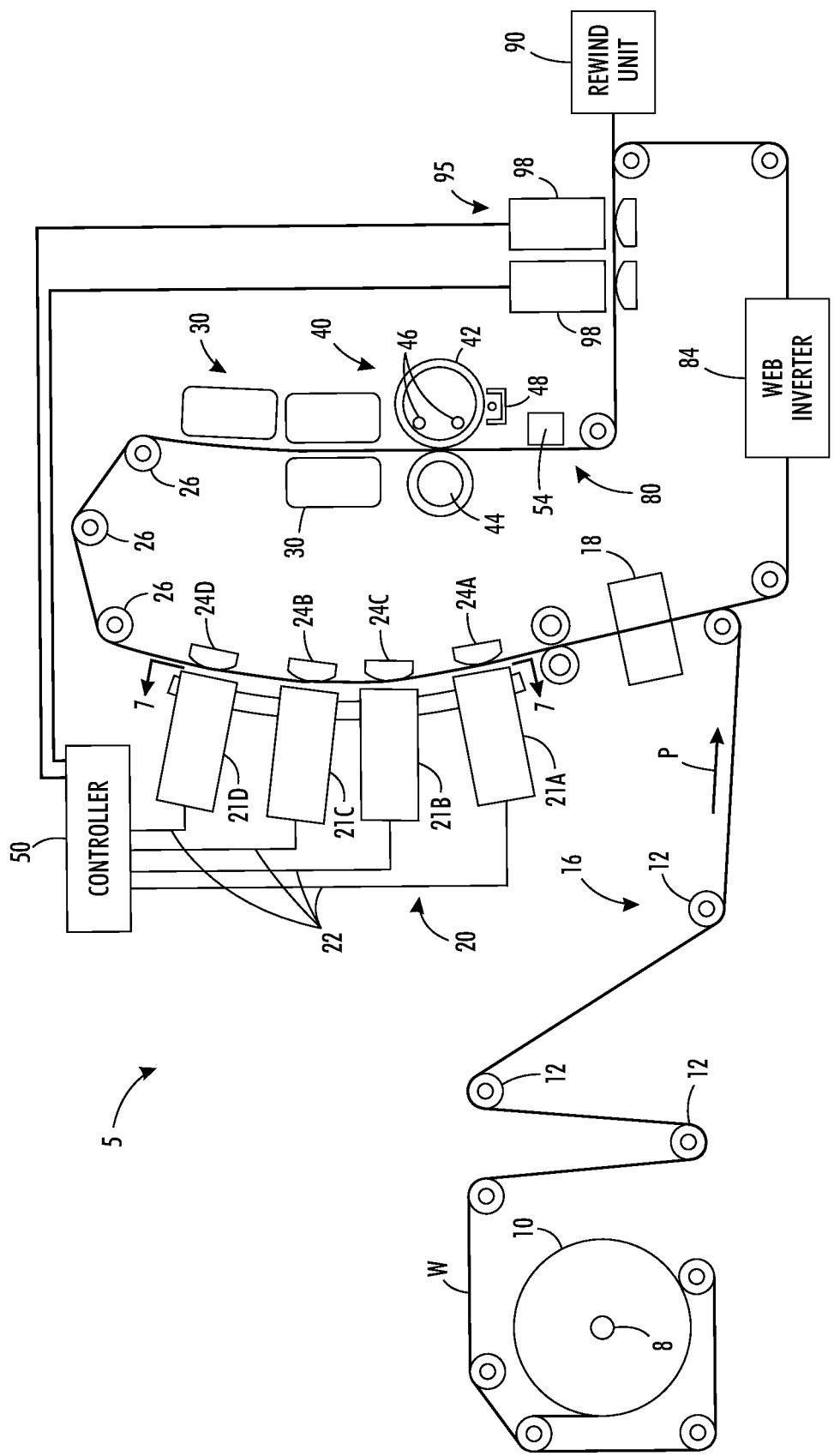
FIG. 4 is a schematic view of an improved inkjet imaging system that ejects ink onto a continuous web of media as the media moves past the printheads in the system.

Referring to FIG. 4, an inkjet imaging system 5 is shown. For the purposes of this disclosure, the imaging apparatus is in the form of an inkjet printer that employs one or more inkjet printheads and an associated solid ink supply. The controller, discussed in more detail below, may be configured to implement the processes described herein to align printheads in the system and the printheads in the system 5 may be configured as described herein. The test pattern and methods described herein are applicable to any of a variety of other imaging apparatus that use inkjets to eject one or more colorants to a medium or media.

The imaging apparatus 5 includes a print engine to process the image data before generating the control signals for the inkjet ejectors. The colorant may be ink, or any suitable substance that includes one or more dyes or pigments and that may be applied to the selected media. The colorant may be black, or any other desired color, and a given imaging apparatus may be capable of applying a plurality of distinct colorants to the media. The media may include any of a variety of substrates, including plain paper, coated paper, glossy paper, or transparencies, among others, and the media may be available in sheets, rolls, or another physical formats.

Direct-to-sheet, continuous-media, phase-change inkjet imaging system 5 includes a media supply and handling system configured to supply a long (i.e., substantially continuous) web of media W of "substrate" (paper, plastic, or other printable material) from a media source, such as spool of media 10 mounted on a web roller 8. For simplex printing, the printer is comprised of feed roller 8, media conditioner 16, printing station 20, printed web conditioner 80, coating station 95, and rewind unit 90. For duplex operations, the web inverter 84 is used to flip the web over to present a second side of the media to the printing station 20, printed web conditioner 80, and coating station 95 before being taken up by the rewind unit 90. In the simplex operation, the media source 10 has a width that substantially covers the width of the rollers over which the media travels through the printer. In duplex operation, the media source is approximately one-half of the roller widths as the web travels over one-half of the rollers in the printing station 20, printed web conditioner 80, and coating station 95 before being flipped by the inverter 84 and laterally displaced by a distance that enables the web to travel over the other half of the rollers opposite the printing station 20, printed web conditioner 80, and coating station 95 for the printing, conditioning, and coating, if necessary, of the reverse side of the web. The rewind unit 90 is configured to wind the web onto a roller for removal from the printer and subsequent processing.

The media may be unwound from the source 10 as needed and propelled by a variety of motors, not shown, rotating one or more rollers. The media conditioner includes rollers 12 and a pre-heater 18. The rollers 12 control the tension of the unwinding media as the media moves along a path through the printer. In alternative embodiments, the media may be transported along the path in cut sheet form in which case the media supply and handling system may include any suitable device or structure that enables the transport of cut media sheets along a desired path through the imaging device. The pre-heater 18 brings the web to an initial predetermined temperature that is selected for desired image characteristics corresponding to the type of media being printed as well as the type, colors, and number of inks being used. The pre-heater 18 may use contact, radiant, conductive, or convective heat to bring the media to a target preheat temperature, which in one practical embodiment, is in a range of about 30° C. to about 70° C.

The media is transported through a printing station 20 that includes a series of color units 21A, 21B, 21C, and 21D, each color unit effectively extending across the width of the media and being able to place ink directly (i.e., without use of an intermediate or offset member) onto the moving media. Each color unit includes an array of printheads, with the printheads of a single color unit shown in more detail in FIG. 5. As is generally familiar, each of the printheads may eject a single color of ink, one for each of the colors typically used in color printing, namely, cyan, magenta, yellow, and black (CMYK). The controller 50 of the printer receives velocity data from encoders mounted proximately to rollers positioned on either side of the portion of the path opposite the four color units to calculate the linear velocity and position of the web as moves past the printheads. The controller 50 uses these data to generate timing signals for actuating the inkjet ejectors in the printheads to enable the four colors to be ejected with a reliable degree of accuracy for registration of the differently colored patterns to form four primary-color images on the media. The inkjet ejectors actuated by the firing signals corresponds to image data processed by the controller 50. The image data may be transmitted to the printer, generated by a scanner (not shown) that is a component of the printer, or otherwise generated and delivered to the printer. In various possible embodiments, a color unit for each primary color may include one or more printheads; multiple printheads in a color unit may be formed into a single row or multiple row array; printheads of a multiple row array may be staggered; a printhead may print more than one color; or the printheads or portions of a color unit may be mounted movably in a direction transverse to the process direction P, such as for spot-color applications and the like.

The printer may use "phase-change ink," by which is meant that the ink is substantially solid at room temperature and substantially liquid when heated to a phase change ink melting temperature for jetting onto the imaging receiving surface. The phase change ink melting temperature may be any temperature that is capable of melting solid phase change ink into liquid or molten form. In one embodiment, the phase change ink melting temperature is approximately 70° C. to 140° C. In alternative embodiments, the ink utilized in the imaging device may comprise UV curable gel ink. Gel ink may also be heated before being ejected by the inkjet ejectors of the printhead. As used herein, liquid ink refers to melted solid ink, heated gel ink, or other known forms of ink, such as aqueous inks, ink emulsions, ink suspensions, ink solutions, or the like.

Associated with each color unit is a backing member 24A-24D, typically in the form of a bar or roll, which is arranged substantially opposite the color unit on the back side of the media. Each backing member is used to position the media at a predetermined distance from the printheads opposite the backing member. Each backing member may be configured to emit thermal energy to heat the media to a predetermined temperature which, in one practical embodiment, is in a range of about 40° C. to about 60° C. The various backer members may be controlled individually or collectively. The pre-heater 18, the printheads, backing members 24 (if heated), as well as the surrounding air combine to maintain the media along the portion of the path opposite the printing station 20 in a predetermined temperature range of about 40° C. to 70° C.

As the partially-imaged media moves to receive inks of various colors from the printheads of the color units, the temperature of the media is maintained within a given range. Ink is ejected from the printheads at a temperature typically significantly higher than the receiving media temperature. Consequently, the ink heats the media. Therefore other temperature regulating devices may be employed to maintain the media temperature within a predetermined range. For example, the air temperature and air flow rate behind and in front of the media may also impact the media temperature. Accordingly, air blowers or fans may be utilized to facilitate control of the media temperature. Thus, the media temperature is kept substantially uniform for the jetting of all inks from the printheads of the color units. Temperature sensors (not shown) may be positioned along this portion of the media path to enable regulation of the media temperature. These temperature data may also be used by systems for measuring or inferring (from the image data, for example) how much ink of a given primary color from a printhead is being applied to the media at a given time.

Following the printing zone 20 along the media path are one or more "mid-heaters" 30. A mid-heater 30 may use contact, radiant, conductive, and/or convective heat to control a temperature of the media. The mid-heater 30 brings the ink placed on the media to a temperature suitable for desired properties when the ink on the media is sent through the spreader 40. In one embodiment, a useful range for a target temperature for the mid-heater is about 35° C. to about 80° C. The mid-heater 30 has the effect of equalizing the ink and substrate temperatures to within about 15° C. of each other. Lower ink temperature gives less line spread while higher ink temperature causes show-through (visibility of the image from the other side of the print). The mid-heater 30 adjusts substrate and ink temperatures to −10° C. to 20° C. above the temperature of the spreader.

Following the mid-heaters 30, a fixing assembly 40 is configured to apply heat and/or pressure to the media to fix the images to the media. The fixing assembly may include any suitable device or apparatus for fixing images to the media including heated or unheated pressure rollers, radiant heaters, heat lamps, and the like. In the embodiment of the FIG. 4, the fixing assembly includes a "spreader" 40, that applies a predetermined pressure, and in some implementations, heat, to the media. The function of the spreader 40 is to take what are essentially droplets, strings of droplets, or lines of ink on web W and smear them out by pressure and, in some systems, heat, so that spaces between adjacent drops are filled and image solids become uniform. In addition to spreading the ink, the spreader 40 may also improve image permanence by increasing ink layer cohesion and/or increasing the ink-web adhesion. The spreader 40 includes rollers, such as image-side roller 42 and pressure roller 44, to apply heat and pressure to the media. Either roll can include heat elements, such as heating elements 46, to bring the web W to a temperature in a range from about 35° C. to about 80° C. In alternative embodiments, the fixing assembly may be configured to spread the ink using non-contact heating (without pressure) of the media after the print zone. Such a non-contact fixing assembly may use any suitable type of heater to heat the media to a desired temperature, such as a radiant heater, UV heating lamps, and the like.

In one practical embodiment, the roller temperature in spreader 40 is maintained at a temperature to an optimum temperature that depends on the properties of the ink such as 55° C.; generally, a lower roller temperature gives less line spread while a higher temperature causes imperfections in the gloss. Roller temperatures that are too high may cause ink to offset to the roll. In one practical embodiment, the nip pressure is set in a range of about 500 to about 2000 psi. Lower nip pressure gives less line spread while higher pressure may reduce pressure roller life.

The spreader 40 may also include a cleaning/oiling station 48 associated with image-side roller 42. The station 48 cleans and/or applies a layer of some release agent or other material to the roller surface. The release agent material may be an amino silicone oil having viscosity of about 10-200 centipoises. Only small amounts of oil are required and the oil carried by the media is only about 1-10 mg per A4 size page. In one possible embodiment, the mid-heater 30 and spreader 40 may be combined into a single unit, with their respective functions occurring relative to the same portion of media simultaneously. In another embodiment the media is maintained at a high temperature as it is printed to enable spreading of the ink.

The coating station 95 applies a clear ink to the printed media. This clear ink helps protect the printed media from smearing or other environmental degradation following removal from the printer. The overlay of clear ink acts as a sacrificial layer of ink that may be smeared and/or offset during handling without affecting the appearance of the image underneath. The coating station 95 may apply the clear ink with either a roller or a printhead 98 ejecting the clear ink in a pattern. Clear ink for the purposes of this disclosure is functionally defined as a substantially clear overcoat ink or varnish that has minimal impact on the final printed color, regardless of whether or not the ink is devoid of all colorant. In one embodiment, the clear ink utilized for the coating ink comprises a phase change ink formulation without colorant. Alternatively, the clear ink coating may be formed using a reduced set of typical solid ink components or a single solid ink component, such as polyethylene wax, or polywax. As used herein, polywax refers to a family of relatively low molecular weight straight chain poly ethylene or poly methylene waxes. Similar to the colored phase change inks, clear phase change ink is substantially solid at room temperature and substantially liquid or melted when initially jetted onto the media. The clear phase change ink may be heated to about 100° C. to 140° C. to melt the solid ink for jetting onto the media.

Following passage through the spreader 40 the printed media may be wound onto a roller for removal from the system (simplex printing) or directed to the web inverter 84 for inversion and displacement to another section of the rollers for a second pass by the printheads, mid-heaters, spreader, and coating station. The duplex printed material may then be wound onto a roller for removal from the system by rewind unit 90. Alternatively, the media may be directed to other processing stations that perform tasks such as cutting, binding, collating, and/or stapling the media or the like.

Operation and control of the various subsystems, components and functions of the device 5 are performed with the aid of the controller 50. The controller 50 may be implemented with general or specialized programmable processors that execute programmed instructions. The instructions and data required to perform the programmed functions may be stored in memory associated with the processors or controllers. The processors, their memories, and interface circuitry configure the controllers and/or print engine to perform the functions, such as the processes for identifying printhead positions and compensation factors described above. These components may be provided on a printed circuit card or provided as a circuit in an application specific integrated circuit (ASIC). Each of the circuits may be implemented with a separate processor or multiple circuits may be implemented on the same processor. Alternatively, the circuits may be implemented with discrete components or circuits provided in VLSI circuits. Also, the circuits described herein may be implemented with a combination of processors, ASICs, discrete components, or VLSI circuits. Controller 50 may be operatively coupled to the print bar and printhead actuators of color units 21A-21D in order to adjust the position of the print bars and printheads along the cross-process axis of the media web.

The imaging system 5 may also include an optical imaging system 54 that is configured in a manner similar to that described above for the imaging of the printed web. The optical imaging system is configured to detect, for example, the presence, intensity, and/or location of ink drops jetted onto the receiving member by the inkjets of the printhead assembly. The light source for the imaging system may be a single light emitting diode (LED) that is coupled to a light pipe that conveys light generated by the LED to one or more openings in the light pipe that direct light towards the image substrate. In one embodiment, three LEDs, one that generates green light, one that generates red light, and one that generates blue light are selectively activated so only one light shines at a time to direct light through the light pipe and be directed towards the image substrate. In another embodiment, the light source is a plurality of LEDs arranged in a linear array. The LEDs in this embodiment direct light towards the image substrate. The light source in this embodiment may include three linear arrays, one for each of the colors red, green, and blue. Alternatively, all of the LEDS may be arranged in a single linear array in a repeating sequence of the three colors. The LEDs of the light source may be coupled to the controller 50 or some other control circuitry to activate the LEDs for image illumination.

The reflected light is measured by the light detector in optical sensor 54. The light sensor, in one embodiment, is a linear array of photosensitive devices, such as charge coupled devices (CCDs). The photosensitive devices generate an electrical signal corresponding to the intensity or amount of light received by the photosensitive devices. The linear array that extends substantially across the width of the image receiving member. Alternatively, a shorter linear array may be configured to translate across the image substrate. For example, the linear array may be mounted to a movable carriage that translates across image receiving member. Other devices for moving the light sensor may also be used.

Figure 5:
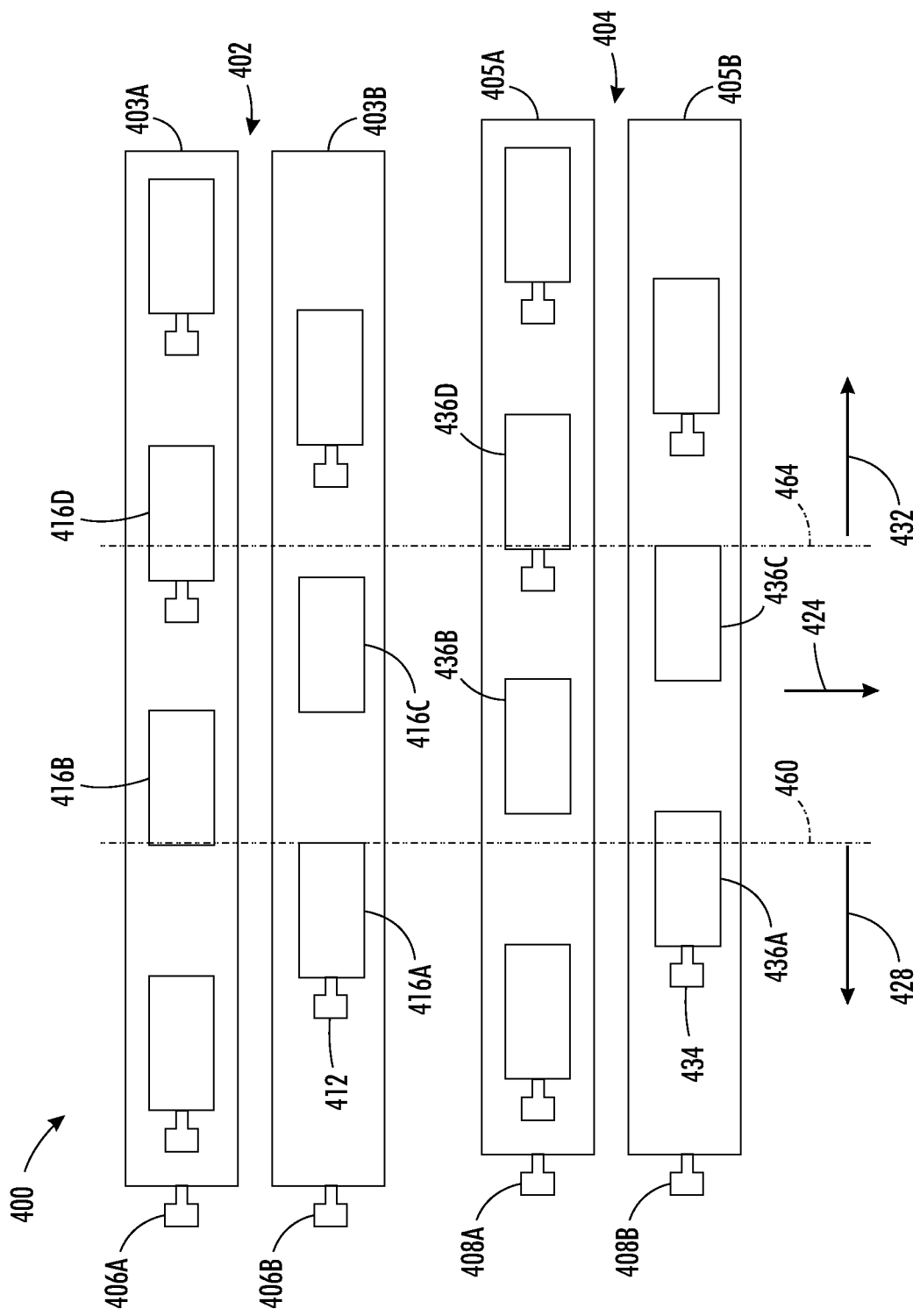
FIG. 5 is a schematic view of an inkjet color station that includes interlaced printheads configured to eject ink having a single color.

FIG. 5 depicts a color station 400 including two print bar arrays 402 and 404 Print bar arrays 402 and 404 may be referred to as "upper" and "lower" print bar arrays, respectively, for descriptive purposes, although the print bars may be oriented in various ways in practical printer embodiments. Print bar array 402 includes print bars 403A and 403B that are operatively connected to actuators, 406A and 406B, respectively. Print bar 403A has an arrangement of four printheads that includes printheads 416B and 416D. Print bar 403B has an arrangement of three printheads that includes printhead 416A and 416C. The printheads on the two print bars are arranged in a staggered formation to enable the printheads on the two bars to emit a continuous line of ink drops in the cross-process direction onto an image receiving member.

Print bar array 404 includes a similar configuration of print bars 405A and 405B that are operatively coupled to electrical motors, or actuators, 408A and 408B, respectively. The print bar array 404 also includes seven printheads arranged in a staggered configuration including printheads 436A-436D. Print bar arrays 402 and 404 are shown in an interlaced configuration. As used herein, "interlaced" printheads in a print bar array include a predetermined offset from one another in the cross-process direction that positions the edges of adjacent printheads in one print bar array within the boundaries of a single printhead in another print bar array. For example, line 460 extends between the rightmost ejector of printhead 416A and the leftmost ejector of printhead 416B in print bar array 402, and intersects an ejector in the printhead 436A in the process direction. Line 464 extends between the rightmost ejector of printhead 436B and the leftmost ejector of printhead 436C, and intersects an ejector in the process direction printhead 416C in print bar array 402. Printhead overlap is defined as the distance in the cross process direction between lines 460 and 464. The amount of overlap between printheads from different print bar arrays may vary with different interlacing configurations. In the example of FIG. 5, ninety-six corresponding ink ejector nozzles in printheads 436A and 416B overlap, but a different number of nozzles may be interlaced in the overlap region. The nozzles in printhead 436A are interlaced with the nozzles in printhead 416B so they are offset from one another in the cross-process direction by one half of the distance between inkjet ejectors within a printhead to enable printing with the full resolution of both printheads. The interlaced configuration seen in FIG. 5 is useful in preventing perceptible white or dark streaks on the image receiving member at cross-process positions that correspond to the adjoining ends of two adjacent printheads in one of the print bar arrays.

In the embodiment of FIG. 5, print bar actuators 406A-406B and 410A-410B are operatively connected to print bars 403A-403B and 405A-405B, respectively. Each print bar actuator is configured to move the corresponding print bar in either of the cross-process directions 428 or 432. Printhead actuators may be operatively connected to individual printheads as well, such as printhead actuators 412 and 434 operatively connected to printheads 416A an 436A, respectively. The printhead actuators are configured to reposition an individual printhead by moving the printhead in cross-process directions 428 and 432. In each of print bars 403A-403B and 405A-405B, all but one of the printheads is operatively connected to a printhead actuator, such as actuator 412, although in general a motor may be attached to all the printheads. The print bar actuators and the printhead actuators may be implemented using electromechanical devices including, electrical motors, stepper motors, and the like. An electronic control device, such as controller 50, generates signals that control the operation of each actuator. In FIG. 5, printheads 416B, 416D, 436B, and 436D are fixedly attached to print bars 403A, 403B, 405A, and 405B, respectively, and do not engage an individual printhead actuator. These printheads may be used as fixed reference printheads, with the remaining printheads in each print bar being adjusted with respect to the fixed position of the fixed printheads.

The configuration of FIG. 5 depicts printheads in stitch alignment in each print bar array. As described below, the printheads may be aligned with an intentional stitch error between the printheads to mitigate the effects of web shrinkage on image quality. As is also described below, the print bar arrays 402 and 404 may move relative to one another in the cross-process direction to reduce or eliminate the effects of banding in images formed from printheads with the stitch error.

Figure 6:
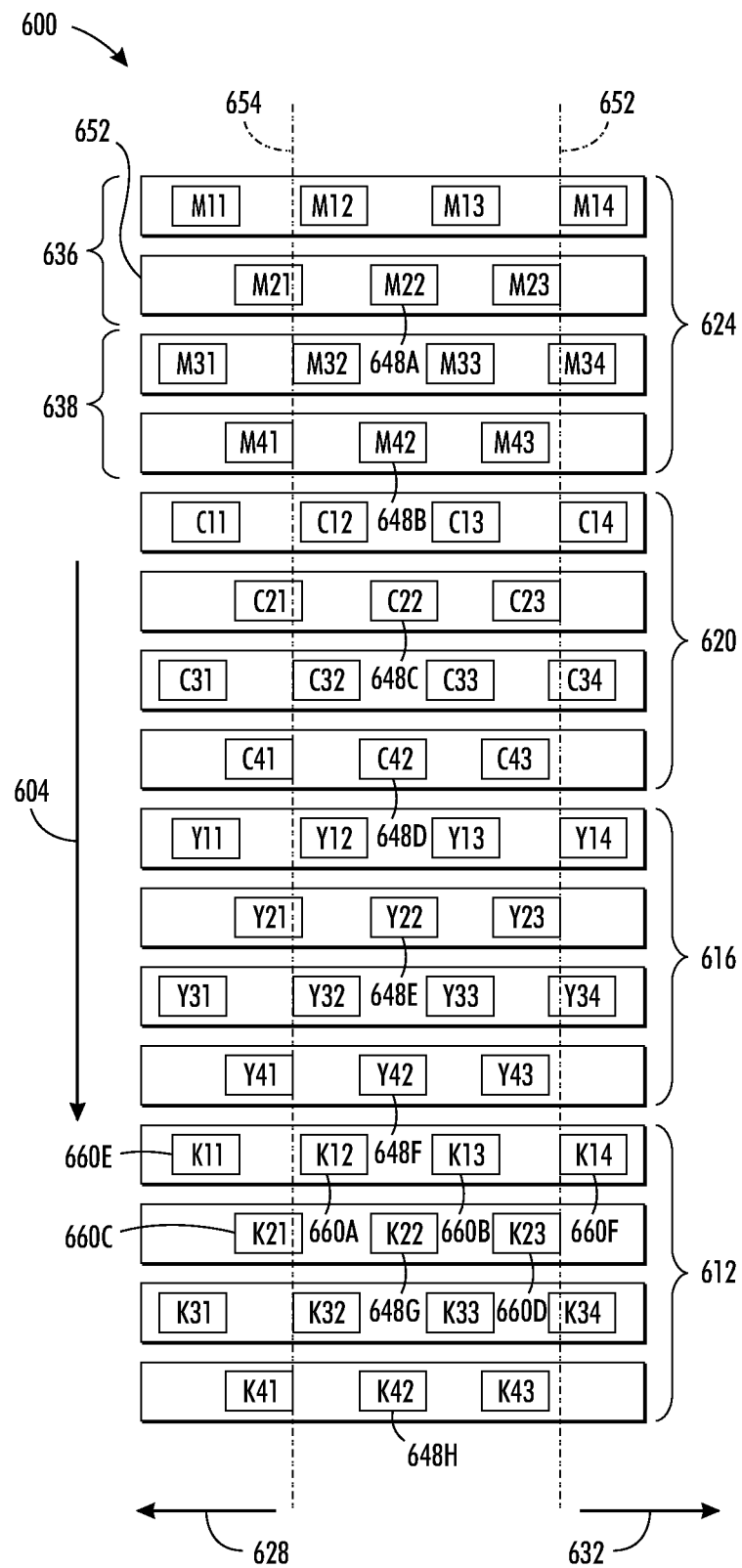
FIG. 6 is a schematic view of a print zone configuration that includes interlaced printhead color stations such as the color station of FIG. 5.

FIG. 6 depicts a print zone 600 including a plurality of color stations 612, 616, 620, and 624 having the same configuration as color station 400 in FIG. 5. The print zone 600 is shown as seen along line 7 in the printing system 5 of FIG. 4. The color stations 612-624 are arranged in the process direction 604. While not shown expressly in FIG. 6, each of the print zones 608-624 include print bar actuators and printhead actuators as shown above in FIG. 5. Each print bar actuator and printhead actuator is operatively connected to the controller 50 to enable the controller 50 to change the cross-process alignment of each printhead in the print zone 600.

In printing zone 600, color stations 612, 616, 620, and 624 are configured to eject black, yellow, cyan, and magenta colored inks, respectively. Each of the color stations 612-624 includes two print bar arrays as exemplified by 636 and 638 in color station 624. Print zone 600 includes fifty-six total printheads, although alternative configurations with different printhead embodiments and color configurations may include a greater or lesser number of printheads.

The printheads in print zone 600 are arranged in the interlaced configuration described above. As seen along line 652, the ends of two adjacent printheads in each upper print bar array in the color units 608-624 overlap a single printhead in the corresponding lower print bar array. Similarly, as seen along line 654, the ends of two adjacent printheads in each lower print bar array overlap a single printhead in the corresponding upper print bar array. In an alternative embodiment, all of the printheads in a print station may be translated in the process direction relative to all of the printheads in a print station of another color. This translation ensures that when colors are printed that combine two or more colors of ink from different print stations, white or dark streaks associated with stitch alignment errors are rendered less perceptible. In the configuration of FIG. 6, printheads 648A-648H are referred to as "central" printheads since they are positioned in the center of the cross-process direction in the print zone in the upper and lower print bar arrays for each color station. In general, any set of printheads that overlap in the process direction can be defined as "central" printheads. The length of the print zone in a system configured as described in FIG. 6 may lead to media shrinkage during the printing process.

In order to correct for media shrinkage, the relative differences in shrinkage between different print bar arrays in the print zone are determined. Since the magnitude of web shrinkage may be different for different color stations, the stitch error introduced for printheads in each color station is also different. One method of measuring the effects of web shrinkage and identifying stitch errors for printheads in a print zone is described in U.S. patent application Ser. No. 12/780,645, filed on May 14, 2010, which is entitled "Method And System For Printhead Alignment To Compensate For Dimensional Changes In A Media Web In An Inkjet Printer," and is commonly assigned to the assignee of this application. Another method for measuring the effects of web shrinkage includes printing a series of lines or marks from ink ejectors in some or all of the printheads in each color station. Using calipers or another measuring device, an operator may identify the magnitude of web shrinkage and the effects of web shrinkage on the registration of different ink colors. In other embodiments, web shrinkage may be estimated instead of being measured directly. Various factors including the operating temperature of the print zone, length of the media path, and type of material used for the media web are used to estimate web shrinkage. Another web shrinkage estimate is based on the proportion of the surface of the media web that is covered in ink. The ink has a higher temperature than the media web at the time the ink is first applied to the media web. The additional heat from the ink may change the degree of web shrinkage. The degree of web shrinkage may change as ink images with different coverage levels are formed on the media web. In some embodiments, the controller, such as controller 50, generates an estimate of web shrinkage with reference to ink coverage of the image receiving member that can be identified from the image data for each printed image.

Figure 7:
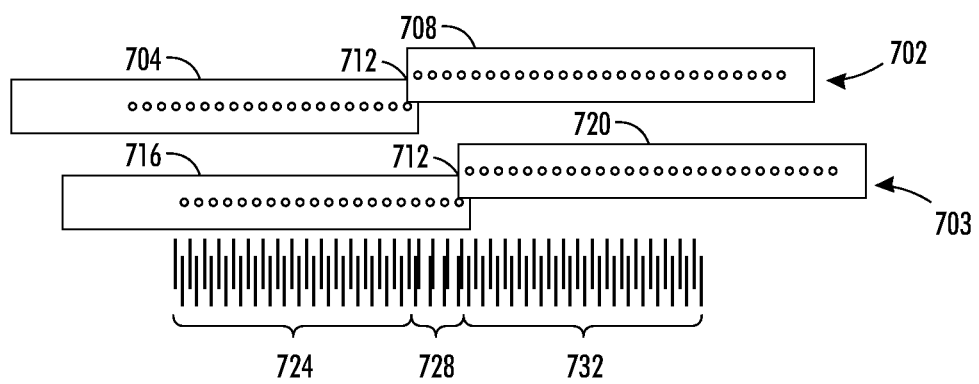
FIG. 7 is a schematic view of interlaced printheads configured to eject ink having a single color, where the printheads form images including banding artifacts.

Applying predetermined stitch errors to adjacent printheads reduces the effects of web shrinkage on the registration of different ink colors on the media web. In interlaced print bar arrays, however, the stitch error between adjacent printheads may generate an image artifact in the region where adjacent printheads in two different print bar units overlap one another. FIG. 7 depicts printheads 704 and 708 in a print bar array 702, with printheads 716 and 720 in an interlaced print bar array 703. Printhead pairs 704-708 and 716-720 include an identical stitch error 712, with region 728 indicating the region between the ends of the pair of printheads. In regions 724 and 732, the relative cross-process alignment between ejectors in the corresponding printheads is accurate with a one half of the distance between inkjet ejectors within a printhead existing between corresponding ejectors in each printhead. In the overlap region 728, however, the cumulative effects of the two stitch errors result in misaligned ink ejectors in the region 728. The misaligned ink ejectors form unevenly colored bands in images that negatively impact image quality. The width of the bands are determined by the size of the interlaced region 728. In one embodiment having an interlaced region as depicted, the corresponding bands are approximately 8 mm in width.

Referring now to FIG. 1, a process 100 repositions printheads in each color unit to account for the effects of web shrinkage while also reducing or eliminating the effects of banding in interlaced printheads. Some or all of the operations in process 100 may be carried out on an electronic control device, such as controller 50 that has been configured with programmed instructions and interface circuitry to implement the described process. Process 100 begins by aligning a central column of printheads in each of the color units in the print zone in the cross-process direction (block 104). As seen in FIG. 6, printheads 648A, 648C, 648E and 648G are examples of central printheads that may be aligned in the cross-process direction for an upper print bar array in each color unit, while printheads 648B, 648D, 648F and 648H may be used as central printheads in the lower print bar arrays. The alignment operations to form stitch errors between printheads process 100 are made with reference to the central printhead in each print bar array.

Process 100 continues by measuring or estimating a magnitude of web shrinkage that occurs for each color station in the printer (block 108) and identifies magnitudes and directions of stitch error to be applied to the printheads in each color station (block 112). As described above, various methods may be used to identify the effects of web shrinkage on color registration. Since the magnitude of web shrinkage may vary for each color station in the print zone, the identified magnitude of stitch error to be applied that corresponds to the measured web shrink may also vary for each color station. In one embodiment, one color station is selected as a reference and the stitch error for that color station is set to a predefined value. One choice of the predefined value may be zero stitch error. The applied stitch errors are then determined by the difference in the web shrinkage between the reference color station and another color station. For example, if the web shrinkage is an average of 20 microns per printhead for the printheads in the magenta color station and the shrinkage is an average of 30 microns per printhead for the printheads in the cyan color station, then selecting the magenta color stations as the reference color station results in a stitch error of zero being applied to the magenta station and a stitch error of 10 microns (30 microns–20 microns) being applied to the cyan station. The direction of the stitch error is selected to offset the error caused by the web shrinkage.

Process 100 may optionally compare the identified magnitude of stitch error to apply to printheads in each color unit to a predetermined threshold (block 120). In some embodiments, introducing a stitch error above a predetermined maximum magnitude results in light or dark streaks forming in printed images, even when web shrinkage occurs. In one example embodiment, a stitch error with a magnitude of greater than 20 μm results in light or dark streaks that may negatively impact image quality.

Figure 2:
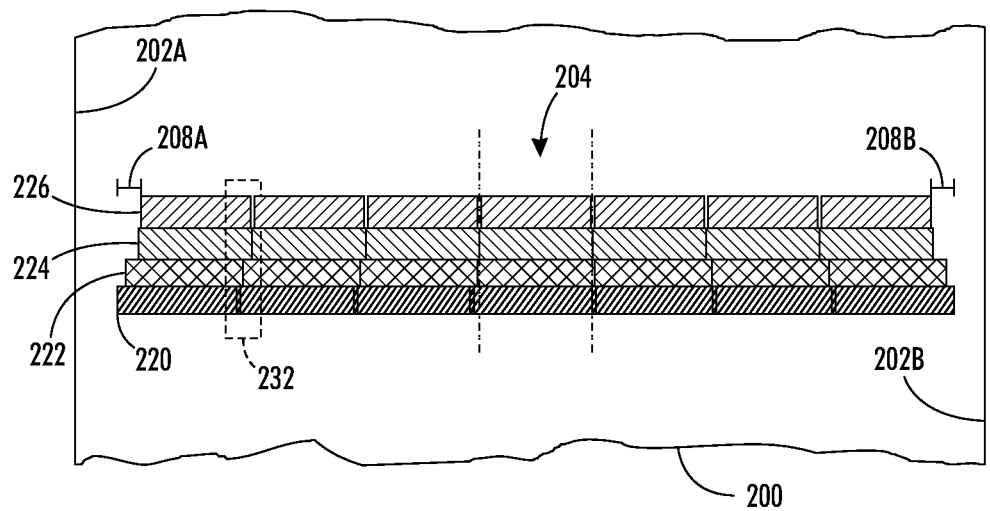
FIG. 2 is a schematic view of multi-color ink images formed by printheads in multiple color stations on a media web that is subject to shrinkage as the web passes through a print zone.

If the identified stitch error magnitude exceeds the maximum predetermined value (block 120), process 100 may reduce the magnitude of stitch error to the maximum predetermined value (block 140). Reducing the stitch error prevents light or dark streaks from being formed in printed images. The total amount of stitch error reduction is restricted to a predetermined range, in order to prevent the reduction in stitch error from generating perceptible registration errors between different colors. The effects of color registration errors are shown in FIG. 2. In FIG. 2, each printhead in the print zones 612-624 may be eject ink drops to form color patterns 220, 222, 224, and 226, respectively on a media web 200. The color patterns 220-226 extend across a media web ending near cross-process edges 202A and 202B of the media web 200.

The color patterns 220-226 depict the effects of web shrinkage with respect to the different color stations in the print zone. Referring to FIG. 2 and FIG. 6, the magenta color station 624 is located at the most upstream location in the media path along the process direction 604. Thus, the magenta ink pattern 226 exhibits the greatest degree of change in registration due to web shrinkage. The cyan pattern 224, yellow pattern 222, and black pattern 220 each exhibit progressively smaller changes in registration due to smaller degrees of web shrinkage as the media web 200 moves through the print zone. The central printheads in each color unit are operated to produce color swatches 204 that are aligned in the cross-process direction. Each set of printheads extending from the central printheads towards the media web edges 202A and 202B adds an incremental amount of color-registration error between multiple ink colors due to the differences in web shrinkage for each color. The largest magnitude of color registration errors are seen at the outer cross-process areas 208A and 208B of the color patterns 220-226. If the magnitude of variances 208A and 208B grow large enough, the errors in image registration due to web shrinkage negatively affect image quality.

Stitch errors with comparatively larger magnitude reduce the overall error that propagates to the edges, and reduce or eliminate perceptible color registration errors. As seen in region 232, the stitch errors between printheads in each of the color patterns 220-226 partially offset the color registration errors caused by web shrinkage. Thus, two different parameters limit the adjustments that may be made in process 100. The magnitude of the stitch errors is limited by the predetermined maximum stitch that avoids light and dark streaks. The reduction to the magnitude of stitch errors introduced in block 140 is also limited to a reduction value that prevents or minimizes registration errors near the edges of the print zone. In the example embodiment of FIG. 4, the reduction in stitch error is limited to a maximum value of approximately 15 µm. As seen in FIG. 2, the magnitudes of errors increase for each printhead that is outside of the central printheads. In an embodiment using seven staggered printheads in each print bar, for three columns of printheads are positioned on each outer side of the central printheads. The total size of the variances 208A and 208B is limited to approximately 45 µm of color registration error. Different printer configurations may have larger or smaller ranges for reducing the size of stitch error while maintaining image quality.

In situations where the identified reduction in stitch error exceeds the predetermined maximum stitch error reduction value (block 144) the printer may generate an alert signal (block 148). In one embodiment, the controller 50 halts printing activity and generates a visual or audible alert in response to receiving the signal. In another embodiment, the signal alerts an operator that the image quality of the printer is being negatively affected. The operator may then perform maintenance tasks to ameliorate the problem or allow the printer to proceed after acknowledging the signal.

If process 100 either identifies a magnitude of stitch error that is below the predetermined maximum threshold (block 120) or reduces the stitch error to within the maximum threshold without exceeding the maximum stitch error reduction value (block 140), then process 100 repositions the printheads in each color station based on the identified stitch error for the corresponding color station. The central printhead in each color station serves as a fixed reference for the stitch error adjustments. The first set of stitch error adjustments are applied to the printheads immediately to the left and right of the central printhead in each print bar unit (block 124). Using print zone 600 as an example, in color unit 624, a central printhead 648G is adjacent to printheads 660A and 660B. The actuators that are operatively coupled to the printheads 660A and 660B move the printheads with respect to the central printhead 648G to produce the identified stitch error.

Figure 3:
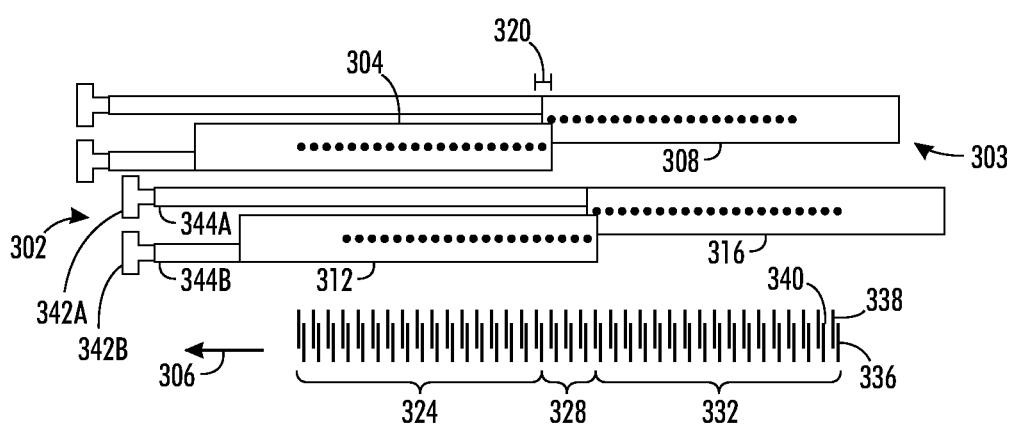
FIG. 3 is a schematic view of interlaced printheads configured to eject ink having a single color, where one set of print bars in the interlaced printheads is offset by an amount that corresponds to a stitch error between the interlaced printheads.

Process 100 operates the actuators coupled to additional printheads extending in the outer direction are activated to introduce the stitch error (block 128) for any additional printheads extending in the outer direction (block 132). Referring again to FIG. 6, an actuator coupled to printhead 660C moves the printhead 660C with respect to printhead 660A to align the printheads 660C and 660A with the identified stitch error. Printhead 660D is aligned with respect to printhead 660B in a similar manner. The process continues for printheads 660E and 660F. The printheads in each of the color stations 612-624 are aligned with the identified stitch error in a similar manner. Process 100 moves one of the print bar arrays in each color unit by one half of the magnitude of the identified stitch error (block 136). The magnitude of stitch error applied is the magnitude as identified in process block 112, and not any reduced stitch error value that may be subsequently identified. As seen in FIG. 3, an exemplary lower print bar array 302 includes printheads 312 and 316, and an upper print bar array 303 includes printheads 304 and 308. Printhead pair 312 and 316 and printhead pair 304 and 308 are each aligned with the same stitch error 320. Print bar actuators 342A and 342B that are operatively connected to print bars 344A and 344B, respectively, in the print bar array 302 move the print bar array 302 by one half, or 50% of, the magnitude of the identified stitch error 320 relative to an upper print bar array 303 including printheads 304 and 308. The entire lower print bar array 302 moves left in direction 306. This movement translates the printheads 312 and 316 to a position that modifies the alignment of the inkjet ejectors in those printheads with the inkjet ejectors in the printheads 304 and 308. This modification in alignment moves the inkjet ejectors in the printheads 312 and 316 left to be closer to the next closest inkjet ejector in the printheads 304 and 308 in that direction. The amount of this movement partially addresses the banding error in the overlap 728. Observation of overlap area 328, which is the position of the printheads 312 and 316 after the movement of the printheads, shows more even spacing in that region than the spacing that existed in area 728 before the move. Thus, this movement attenuates the banding issue. By moving a distance related to a portion of the stitch error and in the direction opposite the stitch error, the banding issue is improved. Consequently the cross-process movement of the printheads 312 and 316 in tandem addresses the banding issue, but it does not affect the relative stitch alignment between the printheads 312 and 316.

The movement of the printheads 312 and 316 relative to the printheads 304 and 308 is movement in the cross-process direction, but the printhead pair 312, 316 is considered in series with the printhead pair 304, 308 because they follow the pair 304, 308 in the process direction. The principles of distributing a portion of a stitch error for a color station between two printheads in series can be extended to three printheads in series. In a color station having three printheads in series, overlap issues could arise between the first and second printheads in series, the first and third printhead in series, and the second and third printheads in series. Once identification of the stitch error for the color station in which the three printheads are located was identified, distribution of the stitch error into translation of one or two of the printheads depends upon any detectable banding artifacts detectable between the various printhead combinations and the relative distances in the cross-process direction between inkjet ejectors in the three series printheads.

As seen in FIG. 3, the movement of the print bar array 302 introduces an error in the cross-process registration of ink ejectors in corresponding printheads in the lower and upper print bar arrays. The error forms "pairs" of ink ejectors that eject ink drops more closely to each other than to neighboring pairs. For example, the cross-process distance between the ink ejectors that form ink marks 336 and 338 is smaller than the cross-process distance between the ejectors that form ink marks 338 and 340. The errors are distributed uniformly across the print bars 302 and 303. Consequently, region 328 exhibits the same ink drop placement as regions 324 and 332.

The banding artifact in region 328 is reduced or eliminated. Since the amount of media web shrinkage may vary as the media web passes each color station in the print zone, the corresponding magnitudes and directions of stitch errors introduced between each printhead in the different color stations may also vary. As described above, the movement of the print bar array 302 is made with respect to the magnitude of the stitch error in each color station. Thus, the arrangement of ejector pairs may vary between different color stations in the print zone.

The lower print bar array 302 may move by one half of the identified stitch error magnitude at any time after the stitch error magnitude is identified, including before during and after the stitch error adjustments of printheads in each color unit. For identified stitches that are negative, where the inkjets at the edge of adjacent printheads are closer than the average spacing of ink ejectors in the printheads, the movement of the lower print unit array is to the left. For identified stitches that are positive, where the inkjets at the edge of adjacent printheads are farther apart than the average spacing of ink ejectors in the printheads, the movement of the lower print unit array is to the right. Additionally, while FIG. 3 depicts the lower print bar array 302 as moving, an alternative embodiment may move the upper print bar unit to achieve the same results. While FIG. 1 and the description above depicts the printhead moves being made in sequence, in one embodiment, the intended moves are all calculated and then they are made simultaneously at the end of the process.

It will be appreciated that variants of the above-disclosed and other features, and functions, or alternatives thereof, may be desirably combined into many other different systems or applications. Various presently unforeseen or unanticipated alternatives, modifications, variations, or improvements therein may be subsequently made by those skilled in the art, which are also intended to be encompassed by the following claims.

What is claimed is:

1. A method for aligning printheads in a printer comprising:
   identifying a stitch error for each color station in a plurality of color stations in a printer, the stitch error in each color station being identified with reference to a dimensional change in a media substrate that occurs at each color station after a first printhead in a first color station ejects ink having a first color onto the media substrate; and
   operating for each color station with reference to the stitch error identified for the color station an actuator to move a first plurality of printheads extending across the media substrate in a cross-process direction to a position where at least one printhead in a second plurality of printheads in the color station overlaps with at least one printhead in the first plurality of printheads in the color station.

2. The method of claim 1 wherein operation of the actuator for a color station modifies in the cross-process direction alignment of a plurality of inkjet ejectors in the first plurality of printheads with a plurality of inkjet ejectors in the second plurality of printheads.

3. The method of claim 1 wherein each actuator is operated with reference to a portion of the identified stitch error.

4. The method of claim 3 wherein each actuator is operated with reference to fifty percent of the identified stitch error.

5. The method of claim 1 wherein the first printhead in the first color station is a printhead centrally positioned across a width of the media substrate in the first color station.

6. The method of claim 5 further comprising:
   aligning with the first printhead in the first color station only one printhead in each color station other than the first color station before identifying the stitch error for each color station in the printer.

7. The method of claim 1 further comprising:
   operating a plurality of actuators to position printheads in the plurality of color stations with reference to the first printhead in the first color station, each printhead within each color station being positioned with reference to the stitch error identified for the color station in which the printhead is located.

8. The method of claim 7 further comprising:
   reducing the stitch error identified for a color station to a predetermined maximum before operating actuators to position printheads within the color station in response to the stitch error identified for the color station exceeding the predetermined maximum.

9. The method of claim 8 further comprising:
   reducing the stitch error identified for the color station to the predetermined maximum in response to the stitch error identified for the color station being within a predetermined range above the predetermined maximum.

10. A method for aligning printheads in a printer comprising:
    identifying a stitch error for each color station in a plurality of color stations in a printer, the stitch error in each color station being identified with reference to a dimensional change in a media substrate that occurs at each color station after a first printhead in a first color station ejects ink having a first color onto the media substrate; and
    adjusting an overlap between a first printhead in a first plurality of printheads that extend across the media substrate and a second printhead in a second plurality of printheads that extend across the media substrate in each color station, each overlap being adjusted with reference to the stitch error identified for the color station in which the first plurality of printheads and the second plurality of printheads are located.

11. The method of claim 10 wherein the overlap adjustment for each color station is made with reference to a portion of the stitch error identified for the color station.

12. The method of claim 11 wherein the overlap adjustment for each color station is made with reference to fifty percent of the stitch error identified for the color station.

13. The method of claim 10 wherein the first printhead in the first color station is a printhead centrally positioned across a width of the media substrate in the first color station.

14. The method of claim 13 further comprising:
    aligning with the first printhead in the first color station only one printhead in each color station other than the first color station before identifying the stitch error for each color station in the printer.

15. The method of claim 10 further comprising:
    positioning printheads in the plurality of color stations with reference to the first printhead in the first color station and with reference to the stitch error identified for the color station in which the printhead being positioned is located.

16. The method of claim 15 further comprising:
    reducing the stitch error identified for a color station to a predetermined maximum before positioning printheads within the color station in response to the stitch error identified for the color station exceeding the predetermined maximum.

17. The method of claim 16 further comprising:
    reducing the stitch error identified for the color station to the predetermined maximum in response to the stitch error identified for the color station being within a predetermined range above the predetermined maximum.

18. A printer comprising:
- a media transport that is configured to transport media through the printer in a process direction;
- a plurality of actuators;
- a plurality of color stations, each color station ejecting ink having a color that is different than the ink ejected by the other color stations in the plurality of color stations, each color station being comprised of a first plurality of printheads and a second plurality of printheads, both the first group and the second group of printheads extending across a portion of the media transport in a cross-process direction that is orthogonal to the process direction, the printheads in the first plurality of printheads being spaced from one another in the cross-process direction and the printheads in the second plurality of printheads being spaced from one another in the cross-process direction, the first plurality of printheads being offset from the second plurality of printheads and configured to print a contiguous line across media being transported through the printer in the process direction, each plurality of printheads in each color station being operatively connected to an actuator in the plurality of actuators to enable each plurality of actuators in each color station to be translated in the cross-process direction independently of the other pluralities of printheads in the printer;
- an imaging device mounted proximate to a portion of the media transport to generate image data corresponding to a cross-process portion of the media being transported through the printer in the process direction after the media has received ink ejected from the printheads in the color stations; and
- a controller operatively connected to the imaging device, the plurality of actuators, and the printheads, the controller being configured to identify a stitch error for each color station in the plurality of color stations, the stitch error in each color station being identified with reference to a dimensional change in a media substrate that occurs at each color station after a first printhead in a first color station ejects ink having a first color onto the media substrate as the media substrate is transported by the media transport and to adjust the offset between the first plurality of printheads and the second plurality of printheads in a color station with reference to the stitch error identified for the color station in which the first and the second pluralities of printheads are located.

19. The printer of claim 18, the controller being further configured to adjust the offset between the first plurality of printheads and the second plurality of printheads in each color station with reference to a portion of the stitch error identified for the color station.

20. The printer of claim 19, the controller being further configured to adjust the offset between the first plurality of printheads and the second plurality of printheads in each color station with reference to fifty percent of the stitch error identified for the color station.

21. The printer of claim 18 wherein the first printhead in the first color station is a printhead centrally positioned with respect to a width of the media substrate in the first color station.

22. The printer of claim 21, the controller being further configured to operate the plurality of actuators to align with the first printhead in the first color station only one printhead in each color station other than the first color station before the controller identifies the stitch error for each color station in the printer.

23. The printer of claim 18, the controller being further configured to operate the plurality of actuators to position printheads in the plurality of color stations with reference to the first printhead in the first color station and with reference to the stitch error identified for the color station in which the printhead being positioned is located.

24. The printer of claim 23, the controller being further configured to reduce the stitch error identified for a color station to a predetermined maximum before positioning printheads within the color station in response to the stitch error identified for the color station exceeding the predetermined maximum.

25. The printer of claim 24, the controller being further configured to reduce the stitch error identified for the color station to the predetermined maximum in response to the stitch error identified for the color station being within a predetermined range above the predetermined maximum.

26. The printer of claim 18 wherein the controller operates an actuator for a first color station ejecting ink of a first color to adjust the offset between the first plurality of printheads and the second plurality of printheads in the first color station by a first distance and operates an actuator for a second color station ejecting ink of a second color to adjust the offset between the first plurality of printheads and the second plurality of printheads in the second color station by a second distance, the first distance being different than the second distance.

* * * * *